United States Patent [19]

Diekmann et al.

[11] Patent Number: 5,566,910
[45] Date of Patent: Oct. 22, 1996

[54] APPARATUS FOR ADJUSTING AIRCRAFT WING FLAPS

[75] Inventors: Thomas Diekmann; Norbert Geyer, both of Bremen; Wilhelm Martens, Delmenhorst, all of Germany

[73] Assignee: Daimler-Benz Aerospace Airbus GmbH, Hamburg, Germany

[21] Appl. No.: 322,055

[22] Filed: Oct. 12, 1994

[30] Foreign Application Priority Data

Oct. 12, 1993 [DE] Germany ............... 43 34 680.4

[51] Int. Cl.$^6$ ............................................. B64C 9/16
[52] U.S. Cl. ........................ 244/216; 244/215; 464/160
[58] Field of Search ................................. 244/215, 216, 244/75 R, 213; 464/160, 97

[56] References Cited

U.S. PATENT DOCUMENTS

| | | | |
|---|---|---|---|
| 2,566,690 | 9/1951 | Wright | 244/75 R |
| 4,381,437 | 4/1983 | Geremia. | |
| 4,702,442 | 10/1987 | Weiland et al.. | |
| 4,717,097 | 1/1988 | Sepstrup | 244/215 |
| 4,834,326 | 5/1989 | Stache | 244/215 |
| 5,050,822 | 9/1991 | Whitehouse et al. | 244/216 |

*Primary Examiner*—Andres Kashnikow
*Assistant Examiner*—Tien Dinh
*Attorney, Agent, or Firm*—W. G. Fasse; W. F. Fasse

[57] ABSTRACT

A wing gap closure flap is positioned in an aircraft wing so that a gap between the wing structure and the leading edge of a landing flap can be closed during normal cruising positions of the landing flap and opened when the landing flap is in a starting position or in a landing position. The gap is formed on the underside of the aircraft wing and the gap closure flap is operated by a positioning shaft which itself is driven through a drive lever linkage by the drive shaft for the landing flap. The wing gap closure flap is connected through a lever mechanism to the positioning shaft which is preferably divided into shaft sections where a plurality of wing gap closure flaps are used. Each shaft section is driven by the landing flap drive shaft. A defined motion of the wing gap closure flap or flaps is achieved in that the positioning of the wing gap closure flaps is synchronized in a limited angular range with the positioning of the landing flap by the cooperation of the respective drive mechanisms.

10 Claims, 4 Drawing Sheets

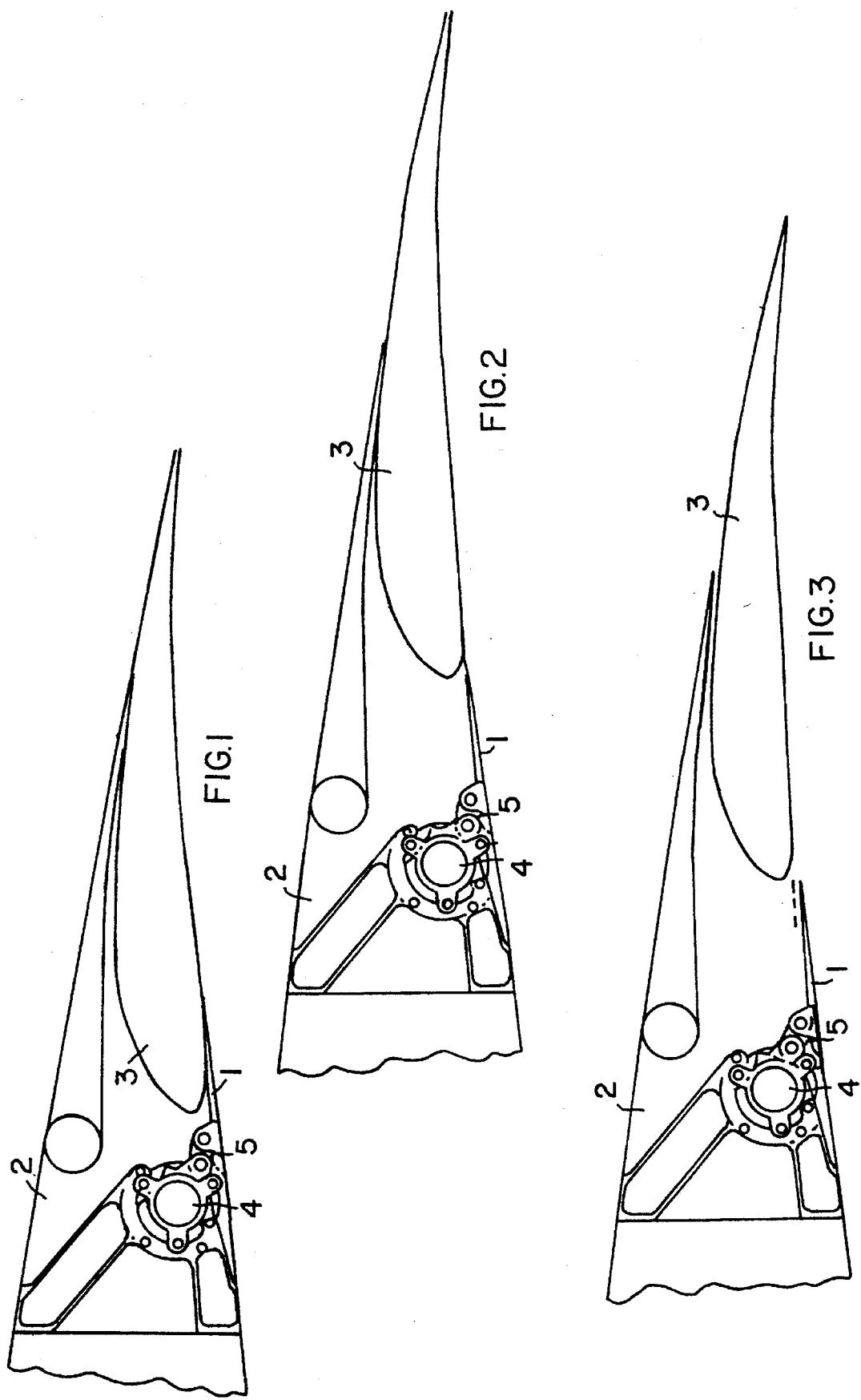

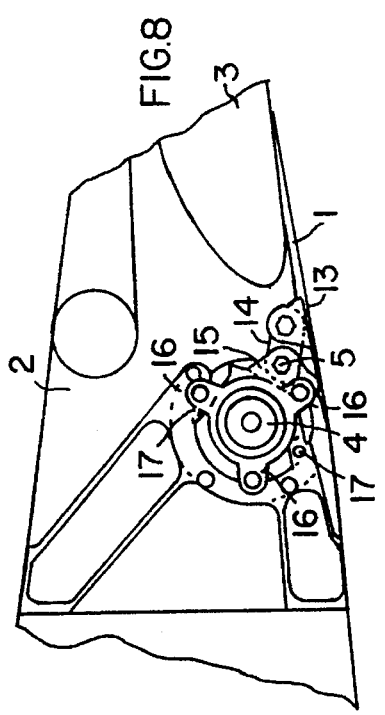
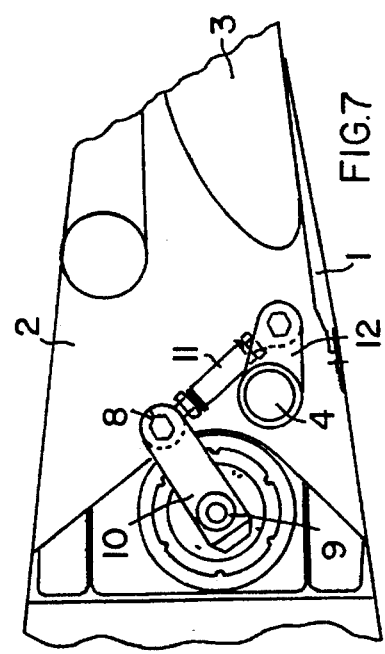
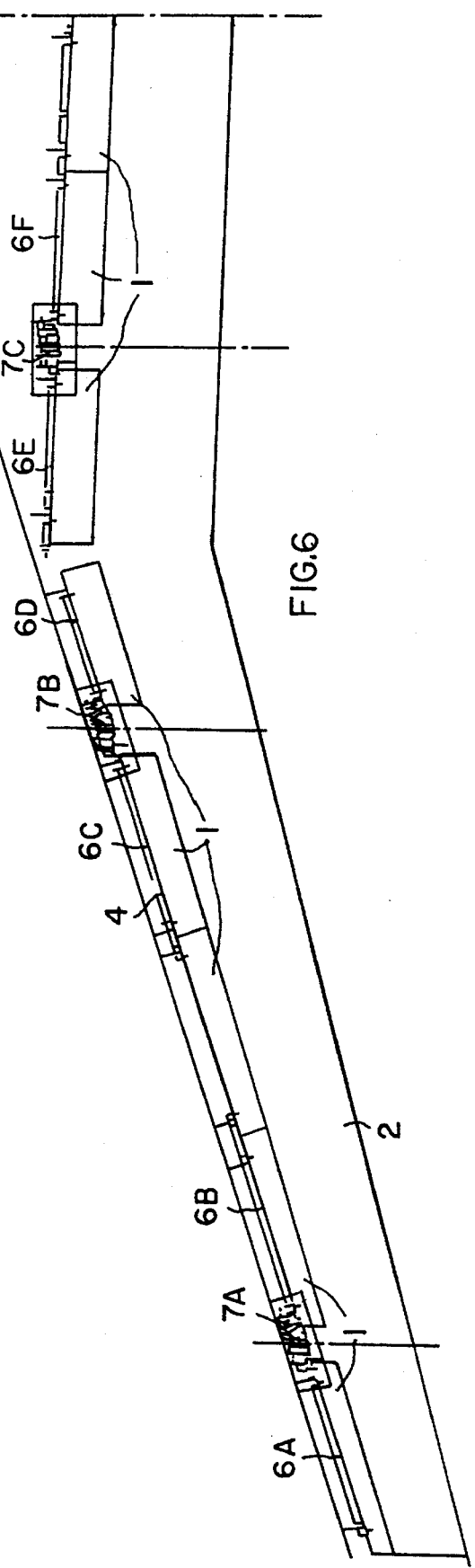

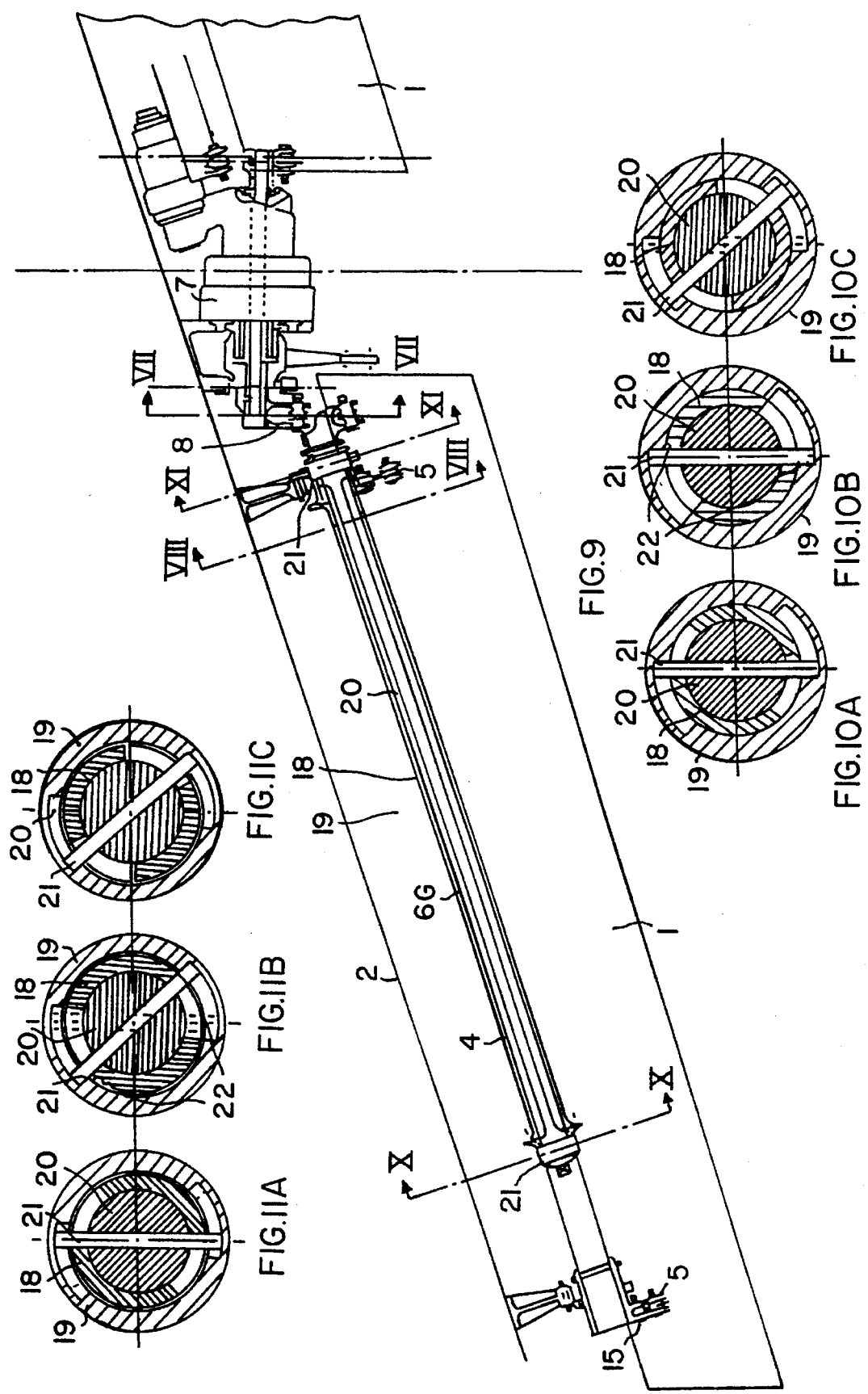

APPARATUS FOR ADJUSTING AIRCRAFT WING FLAPS

FIELD OFF THE INVENTION

The invention relates to an apparatus for adjusting aircraft wing flaps, more specifically for adjusting a wing gap closure flap for controlling a wing gap in an aircraft wing. Such wing gap is formed between the wing structure and the leading edge of the landing flap or flaps.

BACKGROUND INFORMATION

The position of aircraft landing flaps is controlled by landing flap drives in such a way that a variable wing profile curvature is producible. The wing profile is modified by a defined retracting and extending of the landing flap or flaps. Such drives are referred to as "variable camber" landing flap drives.

By using such landing flap drives a gap is formed during normal cruising flight between the wing underside and a leading edge of the landing flap. Such gap should preferably or suitably be covered during normal cruising flight in order to establish advantageous aerodynamic conditions.

The covering of the mentioned gap may be achieved with the aid of a special so-called deflector door referred to herein as wing gap closure flap. Such a wing gap closure flap can on the one hand cover the mentioned gap while on the other hand it can control the air flow during the starting and landing phase. By imposing on the wing gap closure flap a proper position during starting and landing an optimal flow guide may be accomplished between the wing underside and the wing upper side. However, there is room for improvement, especially in the drive for such a wing gap closure flap.

OBJECTS OF THE INVENTION

In view of the above it is the aim of the invention to achieve the following objects singly or in combination:
- to construct a drive mechanism for a wing gap closure flap in such a manner that the flap can reliably be used for guiding the air flow in an aerodynamically advantageous manner;
- to make sure that the wing gap closure flap remains stationary when the landing flap or flaps are within the variable wing profile curvature to avoid any collision between the landing flaps and the wing gap closure flap;
- to control a plurality of such wing gap closure flaps in such a manner that a complex, desired motion sequence for the wing gap closure flaps is realized;
- to drive the wing gap closure flaps free of play so that an accurate position of each individual wing gap closure flap is assured at all times;
- to drive the wing gap closure flap or flaps and the landing flaps of the aircraft wing in synchronism with each other; and
- to protect the drive mechanisms for the wing gap closure flaps against contamination.

SUMMARY OF THE INVENTION

The above objects have been achieved according to the invention in that one or more wing gap closure flaps are connected to at least one positioning shaft which is rotatably mounted for positioning the wing flap or flaps in an area of a gap between a landing flap leading edge and an underside of a wing of the aircraft. Preferably, the positioning shaft is divided into shaft sections each of which is operatively coupled to a respective landing flap drive which provides the drive power to the positioning shaft or positioning shaft sections, which in turn are connected through at least one lever mechanism for transferring a rotational movement of the positioning shaft or positioning shaft sections to the respective wing gap closure flap or flaps.

The just described combination of features assures that the wing gap closure flaps are not operated when the landing flap is within a range which corresponds to the variable wing profile curvature, whereby the respective flaps cannot interfere with each other. Only at the moment when the leading edge of the landing flap or flaps moves into the area of the trailing edge of the wing gap closure flaps, will the latter tilt downwardly slightly out of the wing profile to avoid interference with the landing flap. Thus, a collision between the landing flaps and the wing gap closure flap or flaps is avoided. The wing gap closure flap or flaps are tilted into a maximally upward position when the landing flap is in a starting position or when the landing flap is in a landing position. Between the starting and landing positions of the landing flaps the wing gap closure flap or flaps do not move at all.

In the preferred embodiment the division of the positioning shaft into several positioning shaft sections makes it possible to realize a complex motion sequence for the wing gap closure flaps. Such motion sequence is strictly defined and robust relative to the operational conditions. In other words, the motion sequence of the wing gap closure flaps satisfies the operational conditions strictly. Separate drive elements and controls for such separate drive elements are not necessary since the drive for the wing gap closure flap or flaps is derived from the landing flap drive. Due to the transmission of the rotational motions through a simple mechanical lever mechanism a high reliability of the drive for the wing gap closure flaps is assured. Especially complex and error prone components such as gear drives or cam drives are avoided. Further, the positioning shaft requires very little space for its installation in the wing. Compared to piston cylinder drives, which require relatively large tilting ranges, the tilting range required according to the invention is rather small so that conventional large tilting ranges are avoided.

An especially compact embodiment is achieved in that each positioning shaft section comprises a drive input shaft portion, a drive output shaft portion, and a torsion spring coupling the two shaft portions to each other. In order to assure a power transmission free of play between the shaft portions, the torsion spring is biased.

The performance of a kinematic motion sequence is facilitated in that the biasing of the drive shaft input portion relative to the drive shaft output portion is provided by spring entraining elements which are arranged at the ends of the torsion spring and at the respective shaft portion or section.

In order to limit the angular motion range of the wing gap closure flaps, it is suggested that the spring entraining elements at the spring ends cooperate with stop surfaces forming the spring entraining elements on the input drive shaft portion and on the output drive shaft portion.

In order to limit the rotational motion of the wing gap closure flap relative to the supporting wing structure, the output drive shaft portion further cooperates with stop elements provided in the supporting wing structure.

A defined motion of the wing gap closure flap or flaps as a function of the positioning of the landing flaps has been achieved by a cooperation of the lever mechanism for driving the wing gap closure flaps and a drive lever linkage connecting the positioning shaft to the landing flap drive, specifically the landing flap drive shaft, whereby these drives are synchronized with each other. A compact and robust structure is achieved in that the positioning shaft is connected to the landing flap drive through a drive lever linkage.

A compact structure that is nevertheless not sensitive to contaminations is assured in that the output drive shaft portion and the input drive shaft portion are both hollow, whereby the output drive shaft portion may be is mounted inside the input drive shaft portion or view versa and the torsion spring is mounted inside that drive shaft portion which itself is mounted inside the other shaft portion. In the preferred arrangement the input drive shaft portion or section is mounted inside the output drive shaft portion or section.

The precise motion sequence is further improved in that the spring entraining elements are simultaneously in contact with the input drive shaft portion and with the output drive shaft portion of a positioning shaft section.

BRIEF DESCRIPTION OF THE DRAWINGS

In order that the invention may be clearly understood, it will now be described, by way of example, with reference to the accompanying drawings, wherein:

FIG. 1 is a schematic view illustrating the wing gap closure flap in a gap closing position and the landing flap in a pulled-in position;

FIG. 2 is a view similar to that of FIG. 1, however, showing the landing flap in a position of its maximum variable camber just prior to assuming an orientation for varying the wing profile curvature;

FIG. 3 shows the position of the landing flap in a so-called override position while the wing gap closure flap is in its maximally closed position relative to the gap between the leading edge of the landing flap and the wing structure;

FIG. 6 shows a schematic plan view of an aircraft wing structure with the adjustment mechanism or drives for the wing gap closure flaps and for the landing flaps;

FIG. 7 is a sectional view along section line VII—VII in FIG. 9;

FIG. 8 is a sectional view along section line VIII—VIII in FIG. 9;

FIG. 9 illustrates on an enlarged scale compared to FIG. 7, a detail of the wing structure shown in FIG. 6;

FIGS. 10A, 10B, and 10C show several different positions of the positioning shaft according to section line X—X in FIG. 9; and FIGS. 11A, 11B, and 11C show different positions of the positioning shaft according to section line XI—XI in FIG. 9.

DETAILED DESCRIPTION OF PREFERRED EXAMPLE EMBODIMENTS AND OF THE BEST MODE OF THE INVENTION

Figure 4:
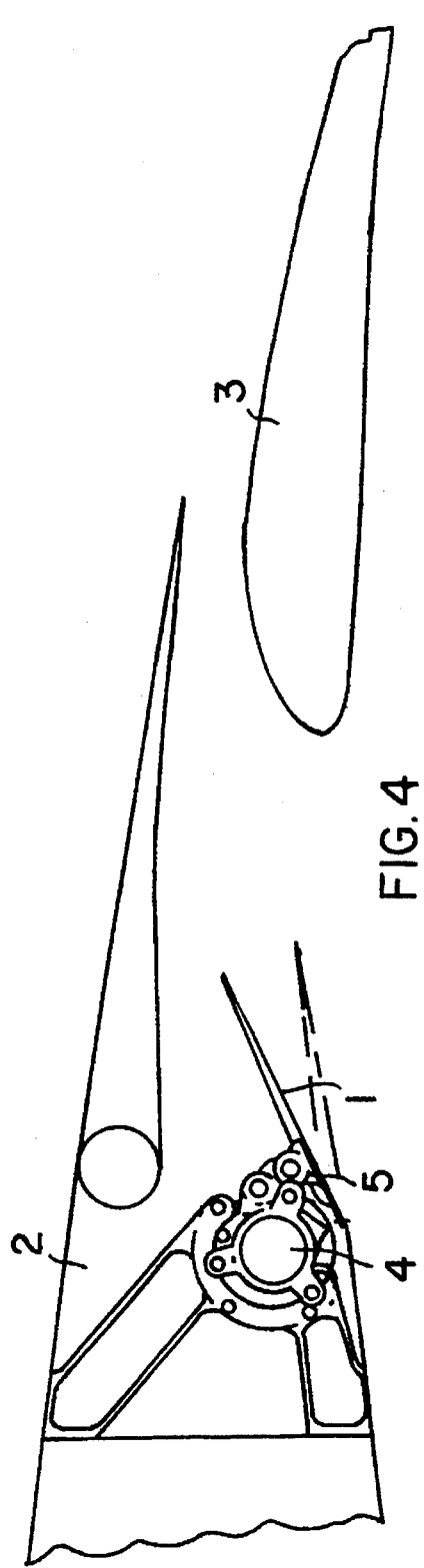
FIG. 4 shows the landing flap in a start position while the wing gap closure flap is in a maximally open position relative to said gap.
Figure 5:
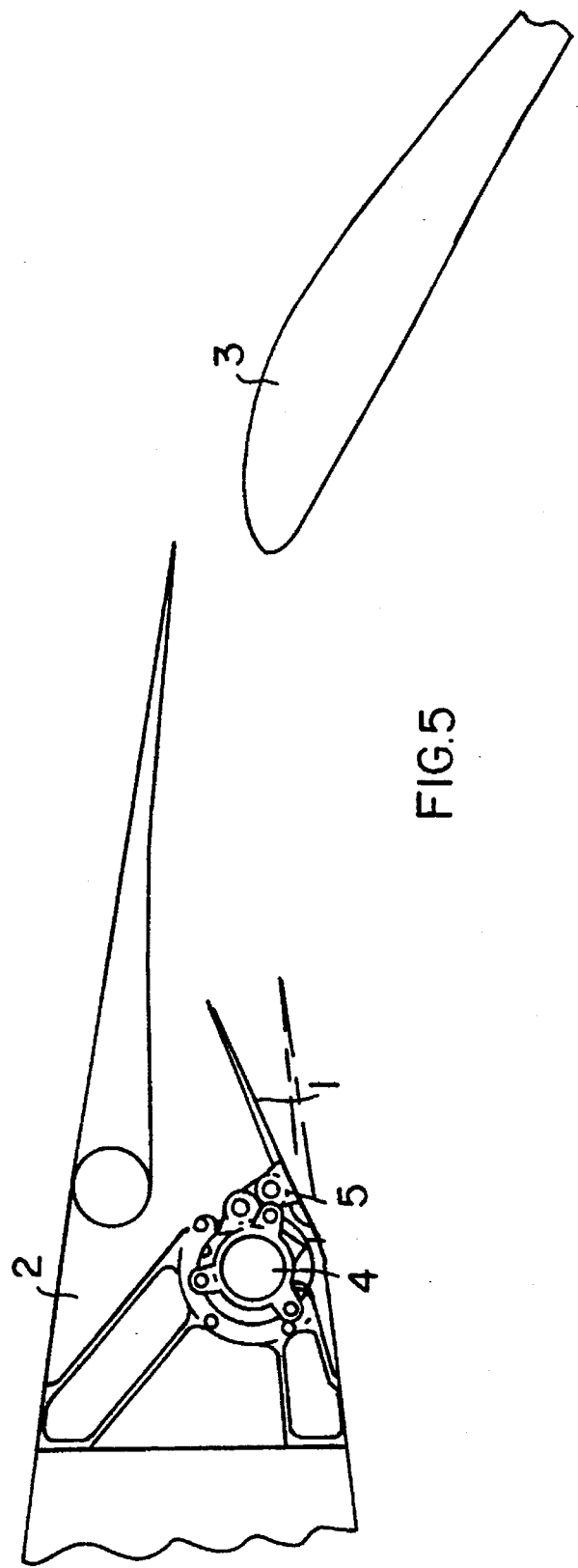
FIG. 5 shows the landing flap in a landing position while the wing gap closure flap is also in a maximally open position relative to said gap.

FIGS. 1 to 5 illustrate the positioning of the wing gap closure flap 1 relative to the positioning of the landing flap 3 during various phases of aircraft operation.

The adjustment mechanism for positioning the wing gap closure flaps 1 is positioned inside an aircraft wing 2. The positioning or operation of the wing gap closure flap 1 is performed in response to or as a function of the positioning of a landing flap 3. A positioning shaft 4 is rotatably mounted in bearings in the wing 2 for driving the wing gap closure flap or flaps 1 through a lever mechanism 5 that couples the positioning shaft 4 to the respective wing gap closure flap 1. The positioning shaft 4 in turn is coupled to the landing flap drive shaft through a drive lever linkage 8, see FIG. 7.

FIG. 6 shows that according to the invention the positioning shaft 4 is preferably divided into a plurality of shaft sections 6A, 6B, 6C, 6D, 6E, and 6F, each of which is connected to at least one wing gap closure flap 1 by the respective lever mechanism 5 shown in FIGS. 1 to 5. The shaft sections 6A to 6F are coupled to a landing flap drive 7 through the drive linkage 8. In the preferred embodiment one landing flap drive 7 drives a pair of positioning shaft sections. For example, the drive 7A is coupled to shaft sections 6A and 6B. The drive 7B is coupled to shaft sections 6C and 6D. The drive 7C is coupled to shaft, sections 6E and 6F.

FIG. 7 shows that the shaft sections 6A to 6F of the positioning shaft 4 are operatively coupled to the drive shaft 9 of the landing flap drive mechanism 7 through the above mentioned drive lever mechanism 8 including lever links 10 and 11 as well as 12. The cooperation of the drive lever mechanism 8 with the lever mechanism 5 assures a synchronism in the positioning of the landing flap 3 with the positioning of the wing gap closure flaps 1. According to FIG. 7 the drive lever mechanism 8 is so constructed that the drive shaft 9 of the landing flap drive mechanism 7 comprises an entraining arm 12 that is driven by the shaft 9 and which is coupled through a coupling lever rod 11 with a further entraining arm 12 which in turn drives the positioning shaft 4, or rather its sections 6A to 6F.

FIG. 8 shows the construction of the lever mechanism 5 that connects the wing gap closure flap 1 to the positioning shaft 4, or rather to its section 6A to 6F which in turn are connected through the drive lever linkage 8 shown in FIG. 7 to the landing flap drive shaft 9. The lever mechanism 5 comprises a mounting bracket 13 to which the wing gap closure flap 1 is mounted. The bracket 13 is secured at 13A to the free end of a lever 14. The other end of the lever 14 is connected to an entraining member 15 secured to an output drive shaft portion 19 which forms part of the respective shaft sections of the positioning shaft 4 to be described in more detail below. The output drive shaft portion 19 is provided with stop projections 16 that cooperate with fixed limit stop elements 17 rigidly secured to the structure of the wing 2, thereby determining the angular range within which the stop projections 16 and thus the output drive shaft portion 19 may move. The stop elements 17 serve as limits for the fully open and fully closed position of the wing gap closure flap 1.

FIG. 9 shows the construction of a positioning shaft section 6G comprising the above mentioned first hollow shaft portion 19 forming the output drive shaft portion 19 of the shaft section 6G and a second hollow shaft portion 18 forming an input drive shaft portion 18. The input drive shaft portion 18 is received and mounted inside the output drive shaft portion 19. The second hollow shaft input drive portion 18 is also hollow and a torsion spring 20 is mounted inside the second hollow shaft portion 18. The torsion spring 20 interconnects the two hollow shaft portions 18 and 19 with each other. The torsion spring 20 biases the two hollow shaft portions relative to each other. For this purpose two spring entraining members 21 are arranged at the end of the torsion spring 20. The spring entraining members 21 are rigidly connected to the torsion spring 20 and press against stop surface 22 on the input drive shaft portion 18 on the one hand, and on the output drive portion 19 on the other hand, the orientation of the stop surfaces or elements 22 is shown in FIGS. 10A to 10C and 11A to 11C. The spring entraining members or elements 21 are simultaneously in contact with both shaft portions 18 and 19. FIGS. 10A and 11A show the relative position of the components to one another when the landing flaps 3 are pulled in. FIGS. 10B and 11B show the relative position when the landing flaps 3 are in an intermediate position. FIGS. 10C and 11C show the relative position when the landing flaps 3 are in an extended landing position.

The size and position of the stop surfaces 22 is selected with due regard to the intended motion sequence. The torsion spring 20 is so dimensioned that the biasing moment corresponds to the maximally required drive moment for the wing gap closure flaps 1 so that the positioning shaft portions 18 and 19 can transmit the required torque moment. If the torque applied is larger than the defined biasing of the torsion spring 20, the input drive shaft portion 18 is turning relative to the output drive shaft portion 19. During the performance of a motion sequence the available angular rotational range is limited by the stop limiting elements 17. The output drive shaft portion 19 first rotates to such an extent that one of the stop projections 16 contacts one of the limiting stop elements 17, whereby a further rotation of the output drive shaft portion 19 is prevented. If the input drive shaft portion 18 should continue to rotate the two spring entraining elements 21 are released, whereby a further torquing of the torque spring 20 is possible, however without transmitting the torque to the output shaft 19.

The limit stop elements 17 are so positioned that a drive in stop bears against the input drive shaft portion 18 during motion through the entire adjustment range of the landing flap 3 which varies the wing profile. The same applies for the drive-out stop in the motion range between the starting position and the landing position of the landing flap. In this range the wing gap closure flap 1 does not perform any motion.

The cooperation of the input drive shaft portion 18 and of the output drive shaft portion 19 with the torsion spring 20, with the spring entraining members 21 and the stop surfaces 22 is illustrated in the various positions for the rotational positioning in FIGS. 10A to 10C and 11A to 11C. Comparing particularly FIGS. 10B with FIG. 10C and FIG. 11B with FIG. 11C, one notices the positioning of the drive input shaft portion 18 relative to the drive output shaft portion 19 with the stop surfaces 22 engaged by the torque applied to the torsion spring 20.

Although the invention has been described with reference to specific example embodiments, it will be appreciated that it is intended to cover all modifications and equivalents within the scope of the appended claims.

What is claimed is:

1. An apparatus for controlling a wing gap in an aircraft wing having landing flaps (3) forming said wing gap, comprising at least one wing gap closure flap (1), at least one rotational positioning shaft (4) for operating said wing gap closure flap (1), bearings rotatably mounting said positioning shaft (4) in said aircraft wing, at least one lever mechanism (5) operatively connecting said positioning shaft (4) with said wing gap closure flap (1), at least one landing flap drive (7) and a drive coupling for transmitting power from said landing flap drive to said positioning shaft (4) for operating said at least one wing gap closure flap (1), wherein said positioning shaft (4) comprises a first hollow shaft section and a second hollow shaft section extending inside said first hollow shaft section and a torsion spring (20) inside said second hollow shaft section, said torsion spring (20) coupling said first and second hollow shaft sections to each other, for permitting a transfer of drive power from one hollow shaft section to the other and for permitting a limited continued rotation of one shaft section relative to the other shaft section when one shaft section is stopped, whereby in end positions of said wing gap closure flap (1) further rotation of one of said shaft sections is taken up by said torsion spring but not transmitted to said wing gap closure flap (1).

2. The apparatus of claim 1, comprising a plurality of wing gap closure flaps, said positioning shaft comprising a plurality of positioning shaft portions, said at least one lever mechanism comprising a plurality of lever links for connecting respective wing gap closure flaps to corresponding positioning shaft portions (6A to 6G).

3. The apparatus of claim 1, wherein said first hollow shaft section of said positioning shaft (4) is a drive output shaft (19), wherein said second hollow shaft section is a drive input shaft (18) inside said drive output shaft (9), and wherein said torsion spring (20) coupling said shaft sections (18, 19) to each other is positioned inside said drive input shaft (18) inside said drive output shaft (19).

4. The apparatus of claim 3, wherein said torsion spring is constructed as a biasing spring to provide a biasing moment corresponding to a maximally required drive moment for said wing gap closure flap (1).

5. The apparatus of claim 3, wherein said drive input shaft (18) and said drive output shaft (19) each comprises a spring entraining member (21), and wherein each end of said torsion spring (20) engages its respective spring entraining member.

6. The apparatus of claim 5, further comprising shaft rotation limiters (22), and wherein said spring entraining members (21) cooperate with said shaft rotation limiters (22) for limiting a rotational movement of said drive input shaft and of said drive output shaft.

7. The apparatus of claim 3, further comprising rotation limiting stop elements (17) in said aircraft wing for limiting the angular rotation range of said drive output shaft (19).

8. The apparatus of claim 3, further comprising a spring entraining member (21) at each end of said torsion spring (20), and wherein said spring entraining member at one end of said torsion spring engages said drive input shaft (18) while said spring entraining member (21) at the other end of said torsion spring (20) simultaneously engages said drive output shaft (19).

9. The apparatus of claim 1, wherein said drive coupling comprises a drive lever linkage (8) connected to said landing flap drive for operating said wing gap closure flap (1) and said landing flap or flaps (3) in synchronism with each other within a limited angular range.

10. The apparatus of claim 9, wherein said drive lever linkage (8) connects said positioning shaft (4) to said landing flap drive (7).

* * * * *